United States Patent [19]
Boivin

[11] Patent Number: 5,505,503
[45] Date of Patent: Apr. 9, 1996

[54] CONDUIT SYSTEM

[76] Inventor: Sylvain Boivin, 6200 de la Griotte, No. 313, Quebec, Quebec, Canada, G2J 1R1

[21] Appl. No.: 187,983

[22] Filed: Jan. 28, 1994

Related U.S. Application Data

[63] Continuation-in-part of Ser. No. 92,647, Jul. 16, 1993, abandoned.

[30] Foreign Application Priority Data

Jul. 31, 1992 [CA] Canada .................................. 2075085

[51] Int. Cl.$^6$ ...................................................... F16L 17/00
[52] U.S. Cl. .......................... 285/364; 285/112; 285/365; 285/367
[58] Field of Search ..................................... 285/112, 364, 285/365, 366, 367, 235, 236, 373

[56] References Cited

U.S. PATENT DOCUMENTS

| | | | |
|---|---|---|---|
| 2,878,041 | 3/1959 | Hobbs | 285/367 |
| 3,042,430 | 7/1962 | Guy | 285/365 |
| 3,967,837 | 7/1976 | Westerlund et al. | 285/112 |
| 4,496,176 | 1/1985 | Weinnold | 285/365 |

Primary Examiner—Eric K. Nicholson
Attorney, Agent, or Firm—Ronald S. Kosie; Robert Brouillette

[57] ABSTRACT

The present invention relates to a conduit system comprising a plurality of conduit elements wherein adjacent conduit elements may be connected together by a coupling means in flexible yet fluid tight fashion. This coupling means may provide a fluid-tight joint despite variations of temperature to which the conduit elements may be subjected. The conduit system may be conveniently used for joining conduits used for feeding water to the turbines of hydro-electric plants. The coupling means may comprise annular rings or flanges fixed on the periphery of each of the pipe ends to be joined together, the annular rings having upwardly and inwardly extending side walls. An annular-type gasket formed of a resilient material may be positioned around the periphery of the rings (e.g. in a bridging relation with same), the annular gasket being positioned in a substantially coaxial alignment with the longitudinal axis of the conduits. The coupling means may also comprise ring clamp means having at least two clamp elements positionable around the annular rings. The clamp elements are provided with a flange receiving channel or groove. With the clamp elements secured about the flanges the gasket member may be radially compressed between the flanges and the clamp means for a fluid tight joint.

48 Claims, 6 Drawing Sheets

CONDUIT SYSTEM

This is a continuation-in-part application of application Ser. No. 08/092,647, filed Jul. 16, 1993, abandoned.

BACKGROUND OF THE INVENTION

The present invention relates to a conduit system for conveying a fluid (e.g. a liquid), the system comprising a plurality of conduit elements (i.e. of large or small diameter) wherein adjacent conduit elements may be connected together by a coupling means in flexible yet fluid tight fashion. The present invention also relates to such a coupling means. This coupling means may provide a fluid-tight (e.g. liquid-tight) joint despite variations of temperature to which the conduit elements may be subjected. The coupling means may, for example, be conveniently used for joining conduit elements for the transport of a liquid such as water; the system may in particular be used for feeding water to the turbines of hydro-electric plants.

In industrial applications where large diameter conduit systems are involved, (such as for the delivery and/or removal of water with respect to hydro-electric power plants), the known practice for connecting and sealing pipe or conduit element ends to each other has been to weld the elements together. The welding technique for joining adjacent ends of large diameter conduit elements has a number of drawbacks. Welding is a labour intensive process requiting the attention of a skilled artisan and is thus inherently relatively expensive to carry out. A large diameter conduit system for a hydroelectric installation is normally assembled in the field, where welding may not be an easy task; welding may, for example, pose a fire hazard during installation. Conduit elements which are connected together by joints which consist solely of a "weld", cannot be easily dismantled for replacement and/or repair. Additionally, welded joints are more or less rigid such that relatively complicated means (e.g. a plurality of expansion joints) must be provided to allow for stress relief in the conduit system due to expansion/contraction of the conduit material in response to temperature changes, due to shifting of the conduit support, etc . . .

Similar problems, such as those related to stress relief, may also be encountered with respect to the connection or coupling of conduit elements (i.e. of large or small diameter) in other fields of activity (e.g. for water maim for the delivery of water for home or industrial purposes, oil pipelines for transporting (crude) oil, etc.). Accordingly, it would be advantageous to have a coupling means whereby conduit elements (e.g. of large or small diameter) may be connected or interlocked in a simple, economical manner, which interlocking may be carried out by relatively unskilled workmen with relatively simple tools.

It would further be advantageous to have coupling means which may provide a pipe coupling or joint which will provide a flexible yet fluid-tight seal between two adjacent ends of pipe or conduit elements. It would, thus, in particular, be advantageous to have a conduit system comprising conduit elements (e.g. of large or small diameter) wherein provision is made for expansion and contraction of the pipe materials while maintaining a fluid tight seal between coupled conduit elements.

It would be particulary advantageous to have a large diameter conduit system of the above sort for directing water to and/or from turbine(s) of a hydroelectric generating plant.

SUMMARY OF THE INVENTION

In accordance with one aspect the present invention relates to a coupling means for connecting together adjacent conduit elements,
characterized in that
said coupling means comprises
   two peripheral flanges, each peripheral flange being fixed to a respective
   conduit element and extending radially therefrom, and
   ring clamp means,
each flange having a first side member, a second side member axially remote from the end of the conduit section relative to the first side member and a peripheral ring member disposed between the first and second side members, the ring clamp means comprising
   a plurality of clamp elements which together are configured for surrounding the said flanges, and
   each said clamp element having a groove configured for receiving said flanges, said groove being defined by a base member disposed between opposed side wall members, said groove and said flanges being configured to co-operate such that when the clamp element is in an operative position, the groove is sized larger than the combined size of the flanges received in the groove so as to provide adjacent ends of the connected conduit elements with a predetermined degree of longitudinal freedom of movement,
and
wherein the coupling means includes
   sealing means for disposition between the peripheral ring members and the base members, and
   means for connecting the clamp elements together about the flanges in an operative position such that
      the sealing means is sandwiched between said peripheral ring members
      and said base members for fluid tight sealing of said coupling means and
      adjacent ends of the conduit elements have a predetermined degree of longitudinal freedom of movement.

As mentioned above, the present invention, in particular, relates to a coupling means suitable for joining conduit elements for a conduit system which may be used for feeding water to turbines in hydro-electric plants; such systems may be very long (e.g. many kilometers in length). The coupling means is particulary suitable for joining length of conduits or pipes which are subject to significant temperature variations.

Thus, in accordance with a particular aspect, the present invention relates to a coupling means for connecting together adjacent large diameter conduit elements characterized in that the said coupling means is as defined above.

More particularly, for example:

A coupling means, in accordance with the present invention may comprise annular rings or flanges fixed on the periphery of each of the adjacent ends of adjacent conduit elements to be joined together, the annular rings having upwardly and inwardly extending side walls. A gasket formed of a resilient material may be positioned around the periphery of said rings (e.g. in a bridging relation with same), the annular gasket being positioned in a substantially co-axial alignment with the longitudinal axis of the conduits. The coupling means may also comprise ring clamp means having at least two clamp elements positionable around the annular rings. The clamp elements are provided with a flange receiving channel or groove; the groove may have a complimentary shape with respect to the side walls of the annular rings to matingly engaging same so that the ends of the conduits may be drawn toward one another when the clamp elements are secured together. The gasket may be of an annular type (i.e. of single element construction) or may comprise a plurality of gasket elements; if the gasket comprises a plurality of elements these elements may if desired be associated with a respective clamp element (e.g. fixed thereto). With the clamp elements secured about the flanges the gasket or sealing member may be radially compressed between the flanges and the clamp means. In a particular embodiment, the annular rings may have a trapezoidal-like shape when viewed in cross section.

In accordance with a further particular aspect, the present invention provides a conduit system comprising a plurality of conduit elements wherein adjacent conduit elements are connected together by a coupling means, characterized in that said coupling means comprises two peripheral flanges, each peripheral flange being fixed to a respective conduit element and extending radially therefrom, and ring clamp means, each flange having a first side member, a second side member axially remote from the end of the conduit section relative to the first side member and a peripheral ring member disposed between the first and second side members, the ring clamp means comprising a plurality of clamp elements which together surround the said flanges, and each said clamp element having a groove configured to receive said flanges, said groove being defined by a base member disposed between opposed side wall members, said groove and said flanges being configured to co-operate such that when the clamp element is in an operative position, the groove is sized larger than the combined size of the flanges received in the groove so as to provide adjacent ends of the connected conduit elements with a predetermined degree of longitudinal freedom of movement, the coupling means including sealing means disposed between the peripheral ring members and the base members, and the clamp elements being connected together about the flanges in an operative position such that the sealing means is sandwiched between said peripheral ring members and said base members for fluid tight sealing of said coupling means and adjacent ends of the conduit elements have a predetermined degree of longitudinal freedom of movement.

The present invention more particularly provides a hydroelectric generating plant water conduit system, comprising a plurality of large diameter conduit elements wherein adjacent conduit elements are connected together by a coupling means, characterized in that the said coupling means is as defined above.

In accordance with the present invention, it shall be understood that the expression "a second side member axially remote from the end of the conduit element relative to the first side member" characterizes the second side member as being farther away from the respective end of the conduit element to be joined than the related first side member of the same flange.

In accordance with the present invention, the opposed side wall members of the groove of a clamp element may each have flat wall surfaces, the wall surfaces sloping away from each other and each flange may have a second side member having a flat surface of complimentary slope to that of a respective side wall member and being configured to permit sliding abutting engagement therewith for urging adjacent ends of the conduit elements towards each other when a clamp element passes from a non-operative position to an operative position.

The groove of a clamp element may have any desired shape or configuration keeping in mind the function thereof, i.e. to limit movement of the conduit elements in cooperation with the flanges and to (sealingly) sandwich the sealing means between it and the flanges.

In accordance with the present invention, the characterization of the groove and flanges received therein as being sized such as to provide "a predetermined degree of longitudinal freedom of movement" shall be understood as characterizing the coupling means as allowing for a certain predetermined amount of longitudinally oriented movement between the pipe ends, i.e. the coupling means provides for a certain amount of play between the conduit ends (e.g. in the form of a small space between the conduit element ends). The degree of movement allowed by any coupling means (e.g. the size of gap between the conduit element ends) will depend on the system characteristics and the desires of the skilled artisan. The degree of movement should not for example be such as to break the (longitudinal) sealing effect of the sandwiched sealing means.

In accordance with the present invention, the opposed side wall members of the clamp elements may, when the clamp elements are in an operative position, touch or abut respective conduit elements. In such case, however, a radial deformation of the conduit elements may be transferred to the side wall members of the clamp elements causing the base members to radially separate from the peripheral ring members such that the fluid tight seal may be broken and result in a leak. This may be dealt with by providing sealing means of appropriate (over) thickness and appropriate resiliency and compressing the sealing means (in the operative position) to a degree whereby a fluid tight (e.g. liquid-tight) seal may be maintained over a predetermined range of displacement of the base member relative to the peripheral ring members due to (radial) deformation of the clamp means. Alternatively (or in addition to the above technique), in order to inhibit such possible deformation of the clamp elements, the opposed side wall members thereof may be sized such that, when the clamp elements are in an operative position, the opposed side wall members of the clamp elements are spaced apart from respective conduit elements a predetermined distance; the distance, for example, depending, inter alia, upon the estimated or anticipated degree of conduit element deformation in light of anticipated environmental conditions, the materials of construction of the conduit elements, etc . . .

In accordance with the present invention, the clamp elements may be connected together by any suitable or desired connection means including welding. If a weld is desired, the ends of the clamp elements may be provided with connection pads or webs (as hereinafter described) but wherein only the pads are welded together to connect the clamp elements in an operative position, the clamp elements being removable in such case by cutting off the pads. However, the connection means is preferably some sort of releasable connection means. A releasable connection means, may for example, include nuts and bolts; any other known type of releasable means may of course be used.

In accordance with the present invention, each flange of the coupling means may be disposed such that the first member of the flange is adjacent to the end of a respective conduit element.

In accordance with the present invention a conduit element may be of small or large inner diameter i.e. of an inner diameter of, for example, up to 500 cm or more, e.g. 0.5 cm to 500 cm.

In accordance with the present invention, a conduit element may, for example, have an inner diameter of 90 cm or less, e.g. 89 cm or less, e.g. an inner diameter of from about 0.5 cm to about 89 cm (e.g. 2.5 cm to 30 cm).

In accordance with the present invention, a conduit element may, for example, have an inner diameter of 90 cm or more, e.g. an inner diameter of from about 90 cm to about 500 cm or more (e.g. 100 cm).

Other dimensions and other physical characteristics of the various elements and members may also vary in relation to such factors as (water) pressure (which may range for example up to 300 psi or more e.g. from 50 to 300 psi), conduit element length, materials of construction, etc.. The coupling means will of course be sized and so constructed as to take such factors into account.

In accordance with the present invention, the coupling means may, if desired, include adjustment means for adjusting the predetermined degree of movement; the adjustment means may take any form. The adjustment means may, for example, comprise an adjustment screw having an abutment end extending through a side wall member of a clamp element groove for abutting contact with a respective side member of the flange. A plurality of such screws may for example be disposed symmetrically about the coupling means.

Various coupling clamp mechanisms, techniques, sealing means, etc, are known which may be incorporated into a system or coupling means of the present invention. The ring clamp means may have any desired number of clamp elements. The ring clamp elements may, for example, comprise two identical ring halls which have inner sides with surfaces for abutting contact with complementary shaped surfaces on the second side members of the flanges; see for example U.S. Pat. Nos. 2,720,079 and 3,398,978 (the entire contents of both of which are herein incorporated by reference) for an example configuration for the grooves and flanges keeping in mind the requirement of the present invention that the requisite play be present between the conduit ends. Insofar as the radially compressible sealing means is concerned these may take on a flat cross sectional structure, a C-type cross-sectional structure, an E-type cross sectional structure, etc . . . See for example U.S. Pat. Nos. 3,351,352, 3,851,901 and 4,561,678 (the entire contents of all of which are herein incorporated by reference); although these latter references show a single sealing means which bridges the gap between the flanges the annular sealing means in the context of the present invention may if desired comprise two or more spaced apart gaskets each gasket individually sandwiched between a respective flange peripheral ring member and the base of the groove of the clamp elements. Example releasable type bolt and nut connections for joining the clamp elements together are for example shown in U.S. Pat. Nos. 2,720,079 and 3,398,987; 4,561,678 shows an alternate releasable connection mechanism. U.S. Pat. No. 2,878,041 (the entire contents of which are herein incorporated by reference) illustrates a possible screw adjustment means which may be adapted for use in the context of the present invention for adjusting the play between the conduit element ends.

DESCRIPTION OF DRAWINGS

One exemplary embodiment of the invention is described in more detail below with reference to the drawings in which.

Referring now to the drawings and more particularly to FIGS. 1 to 4, there is shown a coupling means 5 in accordance with the present invention coupling together the adjacent ends of two large diameter conduit elements designated by the reference numeral 7. Each of the conduit elements 7 have generally the same tubular configuration of circular cross-section; however it will be appreciated that the conduit elements in accordance with the present invention can be of different configuration, the coupling means being configured or shaped accordingly.

Figure 1:
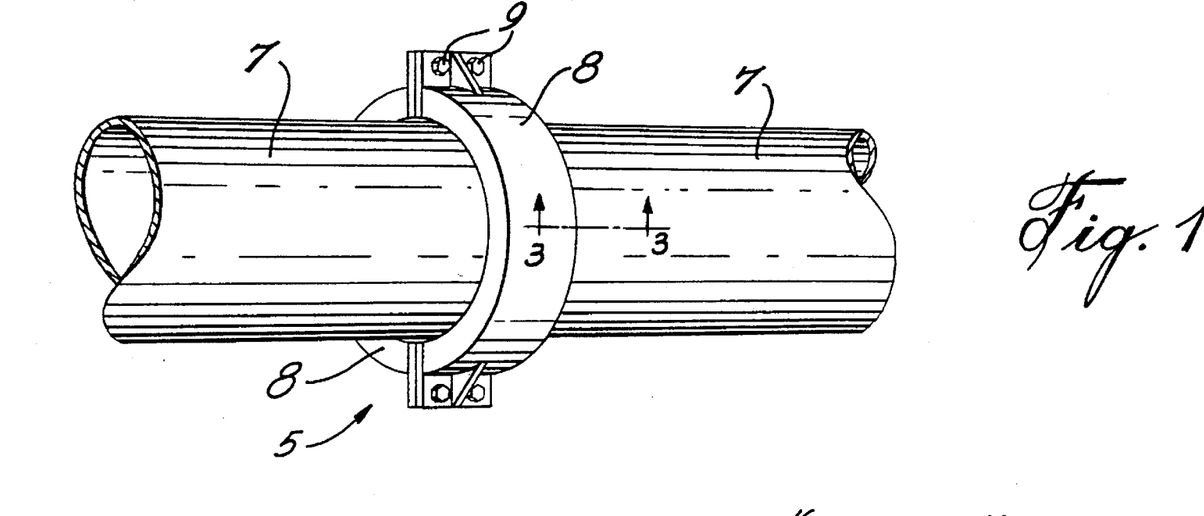
FIG. 1 is a perspective view of portions of conduit elements connected together by an example coupling means in accordance with the present invention.

The coupling means 5 as shown in FIG. 1 has two identical ring clamp elements 8 provided with webs which are bolted together by nut/bolt combinations 9. The clamp elements encircle the ends of the conduit elements 8.

Figure 2A:
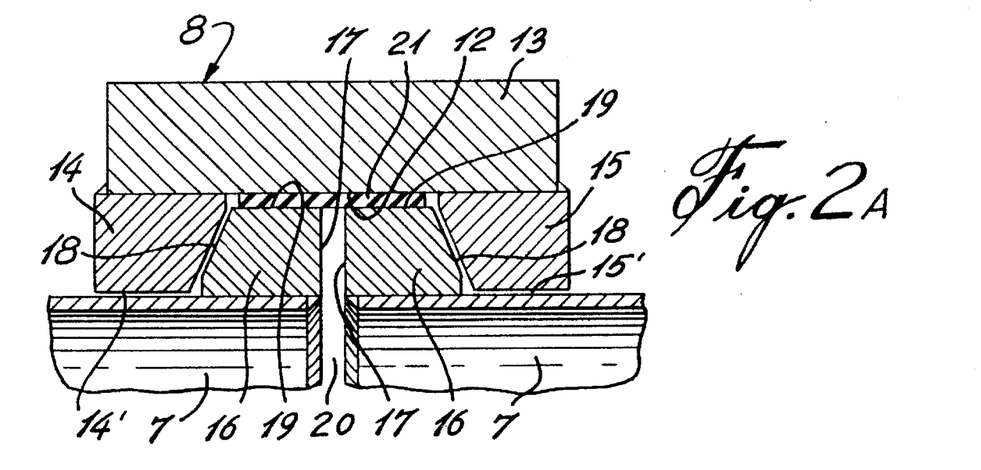
FIG. 2A is a cross section of the coupling means shown in FIG. 1.
Figures 3, 5A, 5B:
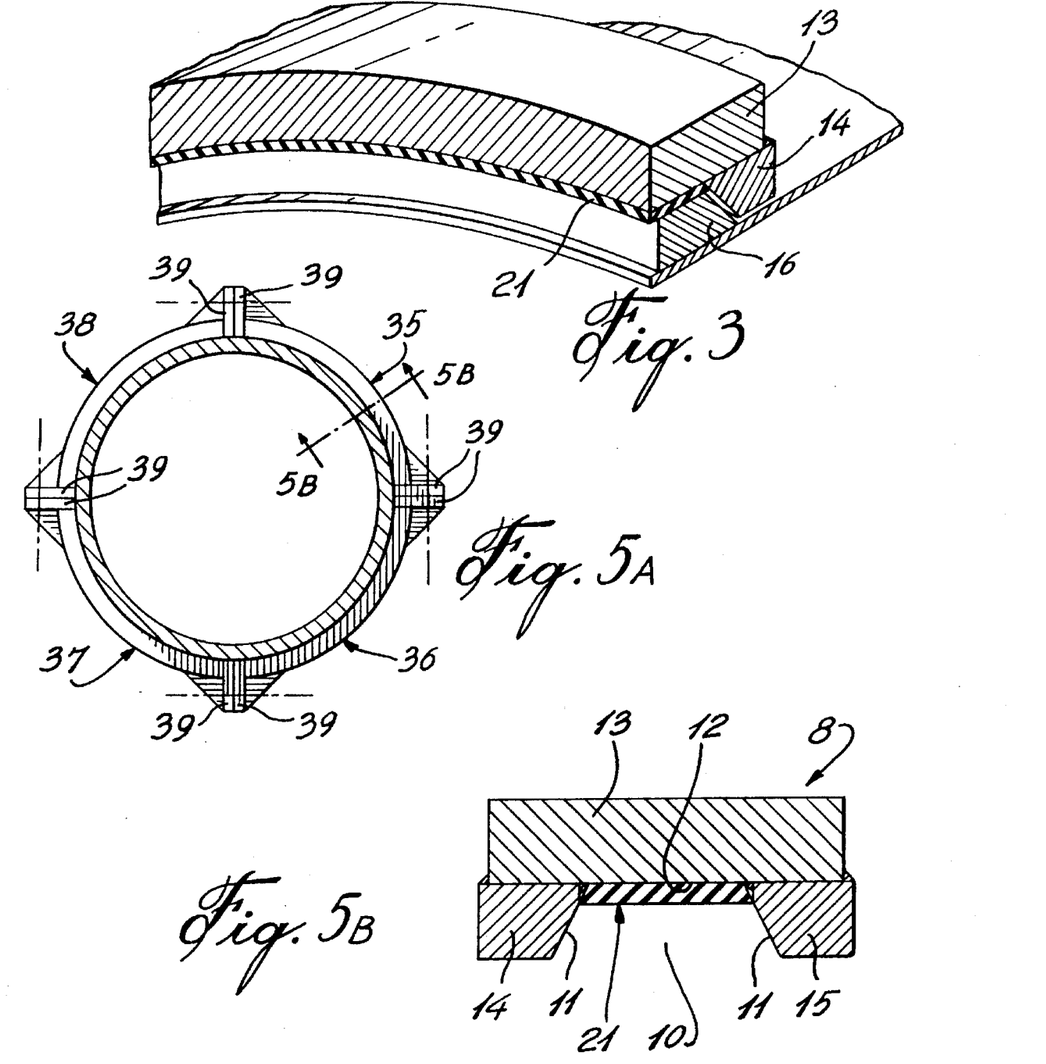
FIG. 3 is a sectional view taken through the pipe coupling system in accord with the invention along 3—3 of FIG. 1.
FIG. 5A is an elevational view of a further example of a clamp means in accordance with the present invention which includes four equal clamp elements releasably together by bolt and nut combinations with the conduit elements removed.
FIG. 5B is a sectional view of an example cross-section of a clamp element taken through the clamp means shown in FIG. 5A along 5—5.

Turning to FIG. 5B each clamp element is provided with a groove 10 defined by opposed sloping side wall surfaces 11 (the side wall members) and a base surface 12 (the base member). The example clamp element embodiments as shown in FIGS. 2A, 5B, etc. are made from three separate pieces or sections 13, 14 and 15, sections 14 and 15 being welded to section 13.

Figure 5C:
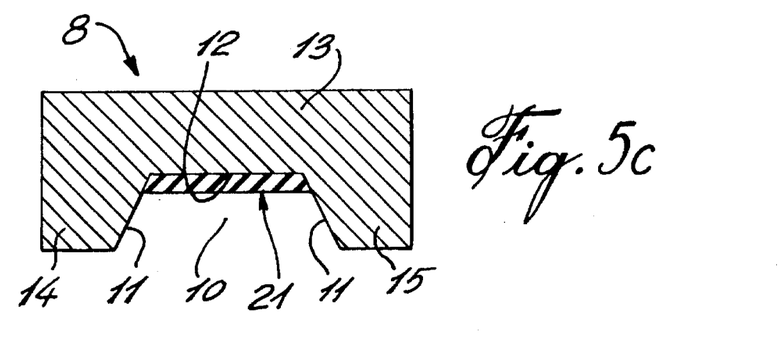
FIG. 5C is a sectional view of an alternate example of a cross-section of a clamp element taken through the clamp means along 5—5 of FIG. 5A.
Figure 7:
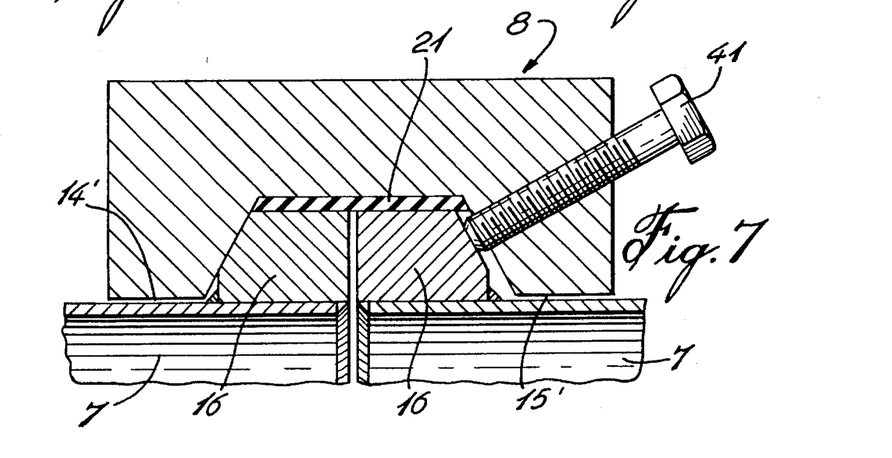
FIG. 7 is a cross sectional of another example of a coupling means view showing screw adjustment means.
Figure 8A:
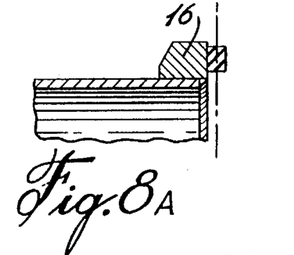
FIGS. 8A, 8B, 8C, 8D, 8E and 8F are cross-sectional views of elements of a coupling means sequentially showing the steps of the process of engaging a coupling system of the present invention in an operative position.
Figure 8B:
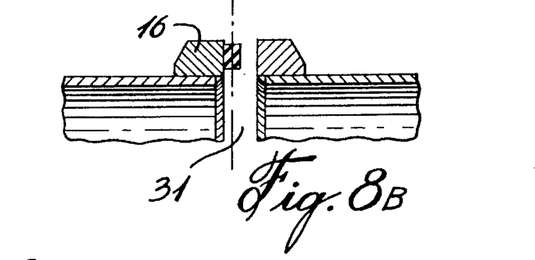
Figure 8C:
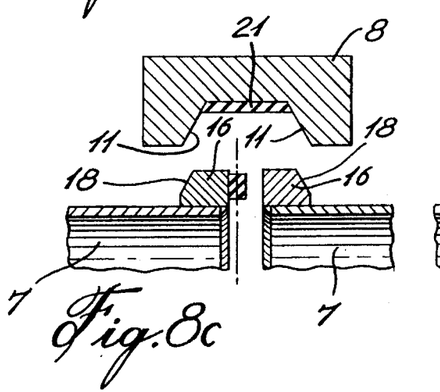
Figure 8D:
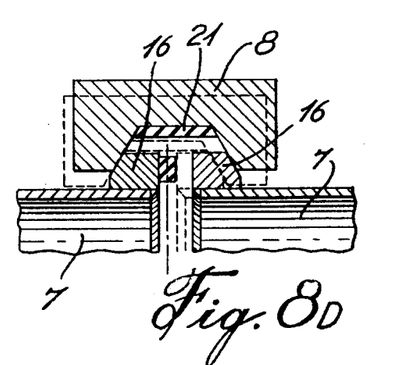
Figure 8E:
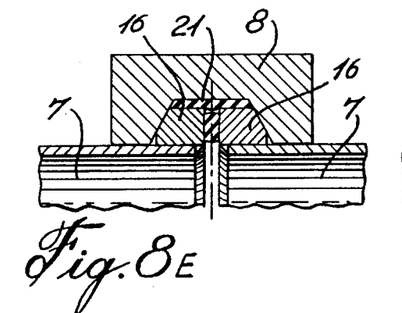
Figure 8F:
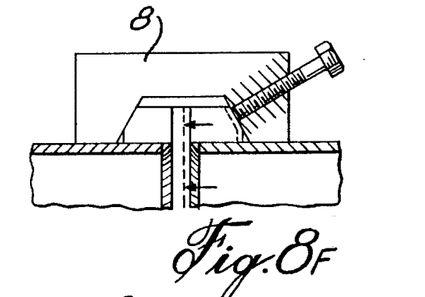

In an alternate embodiment of the clamp elements as seen in FIGS. 5C, 7 and 8, (the same reference numerals being used to designate the same elements) sections 13, 14 and 15 are unitary (e.g. the clamp element is a moulded structure).

Figure 4:
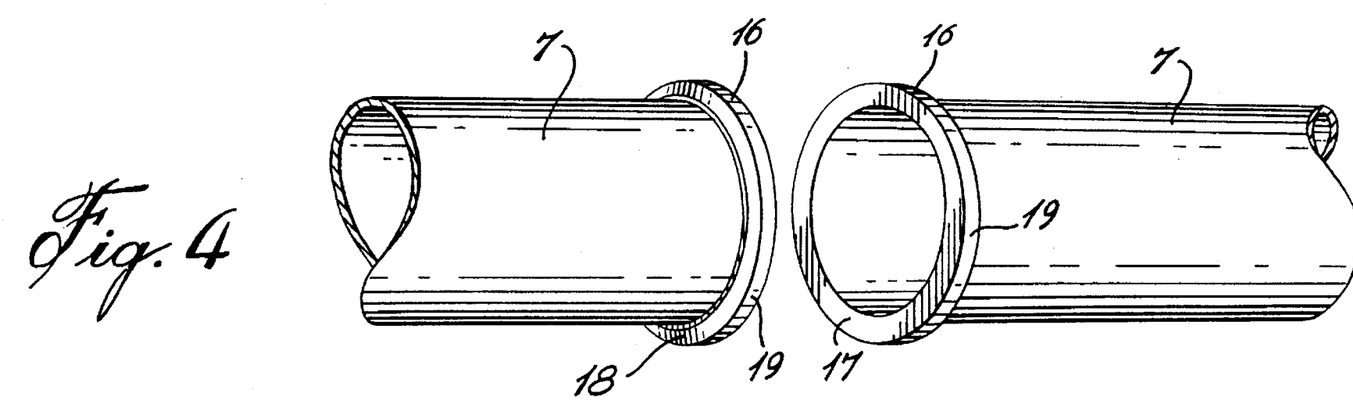
FIG. 4 is a perspective view of portions of conduit elements shown in FIG. 1 with the clamp means removed.

Turning to FIGS. 2A, 3 and 4 the coupling means 5 comprises two annular rings or flanges 16 fixed on the periphery of each of the conduit or pipe elements 7. The annular rings 16 can be welded to the conduit elements 7 or similarly affixed to same or can be made integral with same; the annular rings may be hollow or solid as desired. As may, for example, be seen from FIG. 4, the flanges 16 extend radially for the conduit elements 7.

The annular rings 16 each have a first side surface 17 (the first side member), a second side surface 18 (the second side member) and a peripheral ring surface 19 (the peripheral ring member); as shown the annular tings 16 are solid but may be hollow if desired. As may be seen, the first side surfaces 17 are adjacent to the ends of the respective conduit elements 7 whereas the second side surfaces 18 are on the side of the flanges 16 remote from the conduit element ends relative to the first side surfaces 17. The second side surfaces 18 of each of the annular tings 16 slope upwardly, and inwardly converge (towards each other) so as to provide when viewed in cross-section as a whole, a generally trapezoidal shape or configuration as shown in FIG. 2A. The second side surfaces 18 of the annular rings 16 may matingly engage with the complimentary sloped surfaces of the side wall members of the groove of the clamp elements as it will be appreciated hereinafter.

Turning to FIG. 2A this figure shows the clamp element 8 in an operative position wherein the two flanges 16 are received in the groove 10 (see FIG. 5B) of the clamp element 8. As may be seen the groove 10 and the flanges 16 are sized to cooperate such that a degree of play is provided between the two conduit elements; in the figure shown the play is highlighted (with the surfaces 18 and 11 in abutting contact; surface 11 is shown in FIG. 5B) by a space or gap between the first side surfaces 17, the gap being designated by the reference numeral 20.

For the embodiment of the invention as shown in FIG. 2A, the sections 14 and 15 are sized such that they are disposed a predetermined distance from respective conduit elements 7; in FIG. 2A, the space or gap is designated by respective reference numerals 14' and 15' (see also FIG. 7).

The coupling means 5 also includes a resilient sealing gasket 21 disposed as may be seen in FIG. 2A such that in the operative position it is sandwiched in fluid tight fashion between the base surface 12 and the ring surfaces 19 of the flanges 16. Gasket 21, when properly engaged by the base and ring surfaces (i.e. compressed), provides a fluid tight seal at the joint between the conduit elements.

The gasket 21 may be formed of any material specific to this application and typically, it is formed from a relatively hard rubber-like material. In the embodiment shown in FIG. 2A, the gasket is generally rectangular in cross section.

Figure 2B:
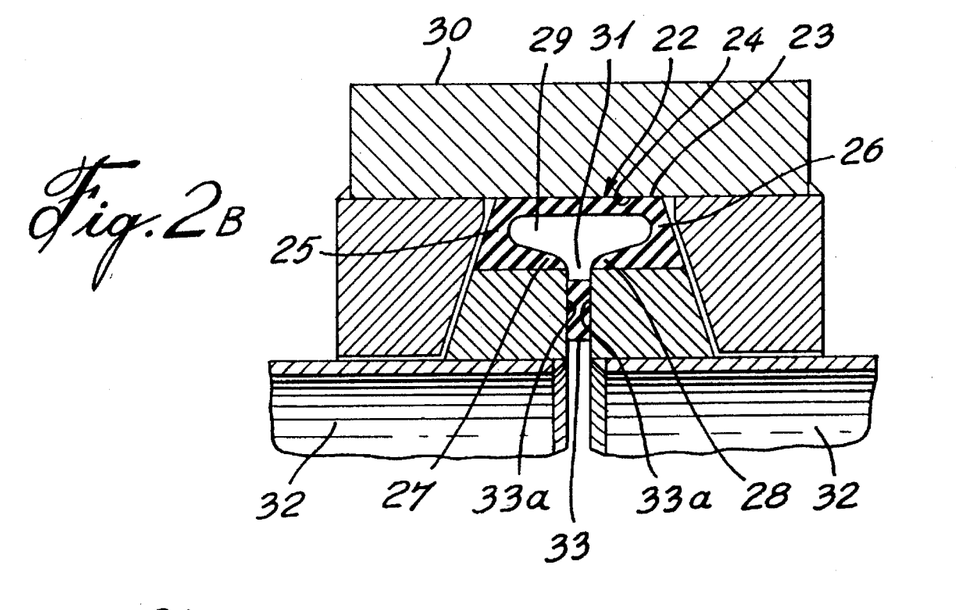
FIG. 2B is a cross section view of a second example embodiment of a coupling means in accordance with the present invention.

An alternate embodiment of a coupling means in an operative position is shown in FIG. 2B. In FIG. 2B, the resilient sealing gasket 22 has a C-shape type cross section. The gasket 22 has a top portion 23 (abutting the base surface 24), side portions 25 and 26, and foot portions 27 and 28. The gasket 22 is provided with an annular cavity 29 being generally of T-shape cross section. The sides 25 and 26 have a surface of slope complimentary to that of the respective abutting surface of the side walls of the coupling element 30.

The distance between the feet 27 and 28 is about the gap 31. Any fluid in the conduit elements 32 which may find its way up through the gap 31 and into the gasket cavity 29 will not, due to the compression applied to the gasket in the operative position, be able to leak out past the gasket. However, if desired, a further secondary (annular) gasket 33 may be provided between the first side members 33a of the flanges.

Turning back to FIG. 2A, as mentioned above, the predetermined play provided to the conduit elements by the flanges 16 and the clamp element 8 is chosen such that the longitudinal displacement of the conduit elements 7 due, for example, to temperature variations, will not result in a separation of the sandwiched gasket 21 from sealing abutment with the ring surfaces 19 of the flanges 16 and the base surface 12 of the clamp element 8.

The above described embodiments of the coupling means (i.e the sloping engagement of the second side members of the flanges and the side wall members of the clamp means) is particularly useful for coupling pipes of large diameter since perfect alignment of the adjacent pipe sections is not necessary before securing same together.

Figure 2C:
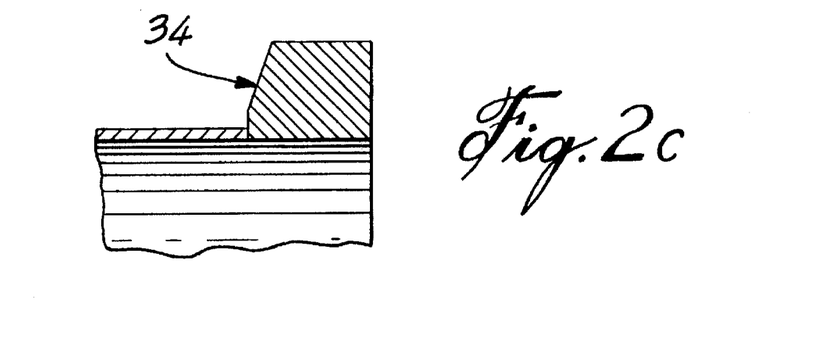
FIG. 2C is a cross section view of a second example embodiment of flange.

As shown in FIG. 2C, the sloped surface 34 of the second side member of an annular flange need not extend over the entire side surface of the flange.

Figure 5D:
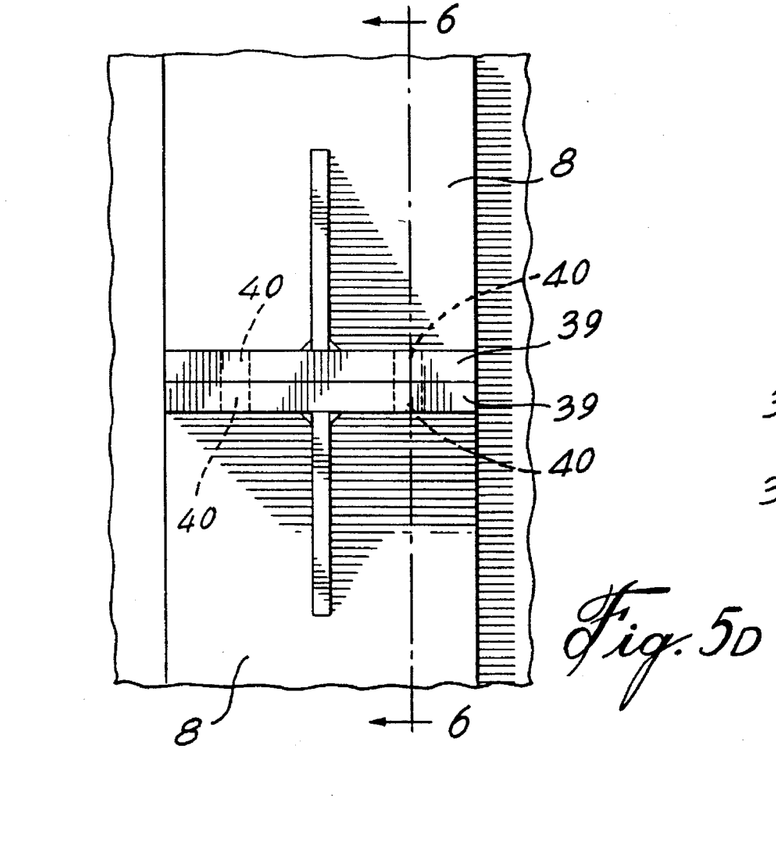
FIG. 5D is a partial side view of the clamp means shown in FIG. 5A showing webs of the clamp connection means with holes therethrough for the engagement of bolt and nut combinations.
Figure 6:
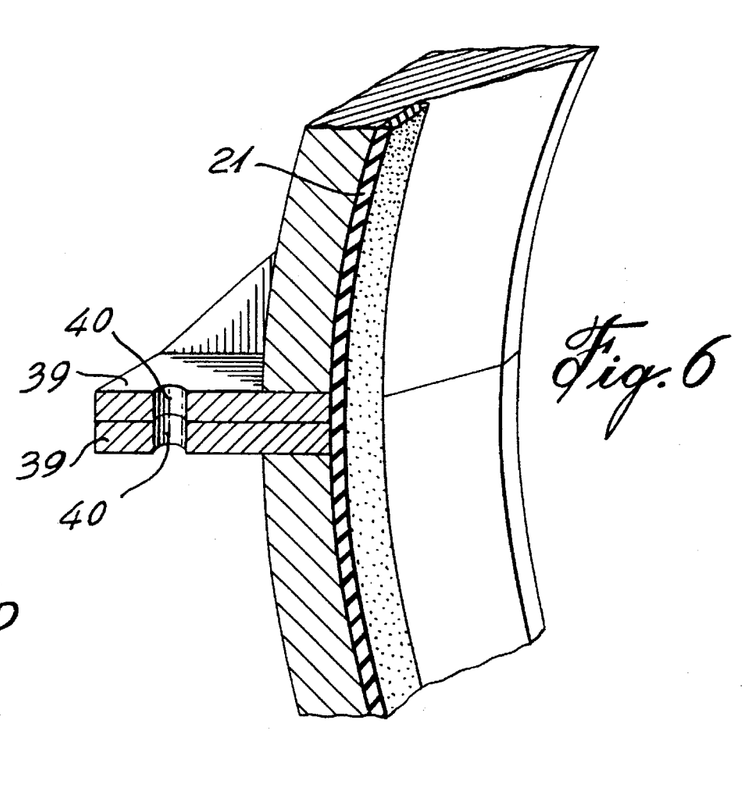
FIG. 6 is a sectional view along 6—6 taken through the clamp element of FIG. 5D.

An alternate form for the ring clamp means is shown in FIGS. 5A, 5D and 6. The clamp means is shown as having four identical clamp elements 35, 36, 37 and 38; these clamp elements need not of course be identical but are preferably so for ease of manufacture. Bolting pads or webs 39 are provided at the end of each of the clamp elements. These bolting pads 39 are used to secure each and every clamp element to one another by bolt(s) (not shown) in threaded engagement with nut(s) (not shown), the body of the bolt passing through aligned holes 40 in adjacent webs 39. Alternatively, as mentioned above, the pads 39 may be welded together in the region of the holes 40; in order to remove the clamp elements from the operative position, however, the pads can be cut at some point between the weld and the body of the clamp elements so as to free the pads from each other. A releasable mechanism is, however, preferable to such a weld, i.e. for simplified installation and removal.

Each of the clamp sections may if desired be provided with external ridges (not shown) for augmenting the strength thereof so as to withstand high(er) pressure(s). It is to be understood that such ridges can be welded directly onto the clamp elements.

FIGS. 8A to 8F illustrate sequentially, the attachment of the ring clamp means to the flanges. Starting with FIGS. 8A and 8B, the ends of adjacent conduit elements are disposed near to one another, in at least approximate alignment with one anothers' respective longitudinal axes and spaced apart to define a gap therebetween. Each of the clamp elements may if desired have fixed to the base surface thereof a portion of the sealing gasket; the section of gasket fixed thereto may extend beyond the length of the base surface a small amount such that when the clamp elements are in the operative position the ends of adjacent gasket sections are forced into abutting sealing contact. During the alignment process, however, if the clamp elements do not have a gasket section fixed to the base surface, a single annular sealing gasket 21 may be placed about the adjacent ring surfaces of the flanges i.e. the gasket being sufficiently wide so as to cover the gap 31. The clamp elements 8 are then clamped over and about the junction of the flanges by means of nuts and bolts (not shown). When the surfaces 11 of the clamp elements abut respective second surfaces 18 of each of the flanges 16, the generally inwardly radially directed force created by the connecting the clamp elements together (more particularly by the tightening of the bolts and nuts) is transferred into a longitudinally directed force forcing the flanges towards each other until a desired predetermined spacing of the ends of the conduit elements is achieved. During the tightening, gasket 21 will sandwiched into sealing engagement with the flanges and clamp means. The spacing or gap will ensure the possibility of relative movement of one pipe with respect to the other.

As shown more particularly in FIG. 7 screw adjustment means 41 in the form of a bolt can be used to force the end of one conduit element toward the other as a simple mechanism for adjusting the degree of play (i.e. gap size) available between the ends of conduit elements; any number of such screw adjustment means may be provided. A plurality of such adjustment means may, for example, be disposed symmetrically about the clamp means.

Figure 9:
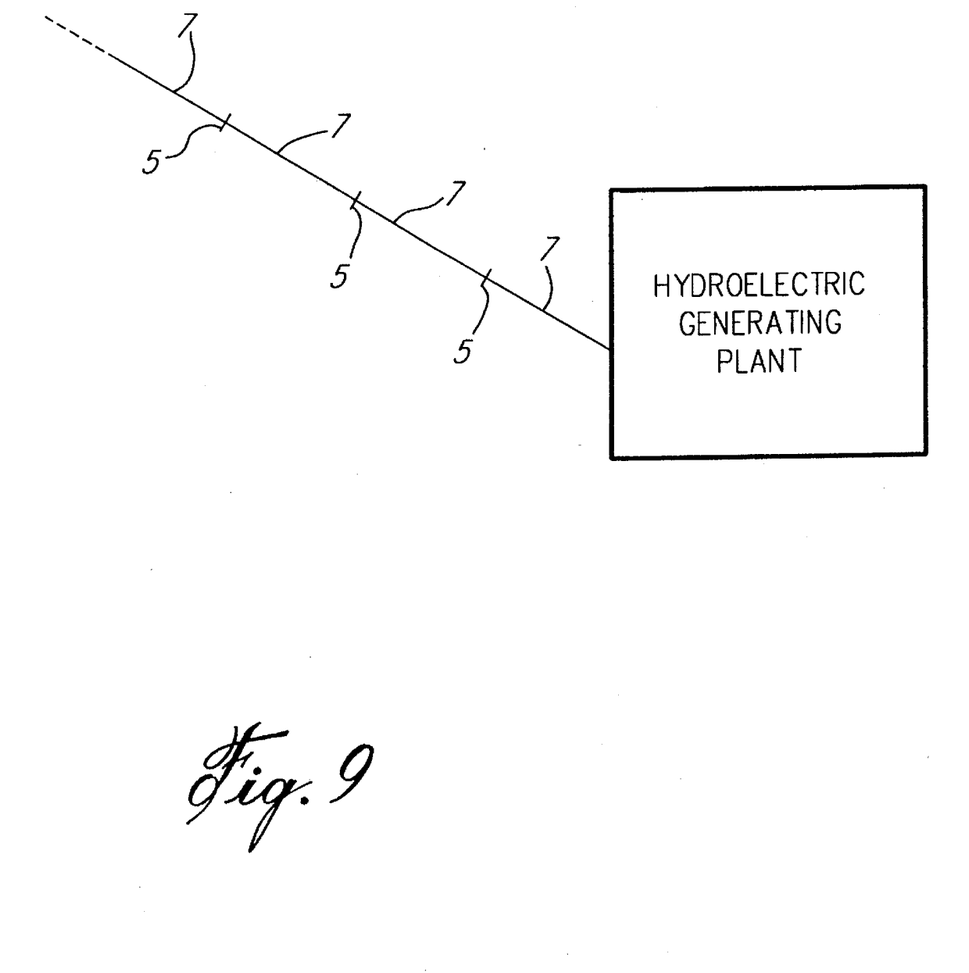
FIG. 9 is a schematic illustration of a hydroelectric generating plant water conduit system in accordance with the present invention.

Turning to FIG. 9, this figure illustrates in schematic fashion a hydroelectic generating plant water conduit system comprising a plurality of conduits 7 connected together by respective coupling means 5, i.e. the conduit system being connected to a turbine of a hydroelectic generating plant for directing water thereto.

It will be understood further that variations or modifications can be undertaken in the module illustrated and described by those skilled in the art without departing from the spirit and scope of the invention as defined by the appended claims. For example, the dimensions mentioned above are given for the sake of clarity only and should not be construed as limiting the invention in any way. The clamp elements, the annular tings, the sealing means can have a different shapes than those illustrated in the enclosed drawings. Thus, the clamp elements may comprise radially extending lugs provided with openings to receive securing means in the form of bolts and nuts.

In the foregoing description certain terms have been used for brevity, clearness and understanding, but no necessary limitations are to be implied therefrom beyond the requirements of the prior art, because such words are used for descriptive purposes herein and are intended to be broadly construed.

I claim:

1. A conduit system comprising a plurality of conduit elements wherein adjacent conduit elements are connected together by a coupling means,
characterized in that
said coupling means comprises
two peripheral flanges, each peripheral flange being fixed to a respective conduit element and extending radially therefrom, and
ring clamp means,
each flange having a first side member, a second side member axially remote from the end of the conduit section relative to the first side member and a peripheral ring member disposed between the first and second side members, the ring clamp means comprising
a plurality of clamp elements which together surround the said flanges, each said clamp element having a groove configured to receive said flanges, said groove being defined by a base member disposed between opposed side wall members, said groove and said flanges being configured to co-operate such that when the clamp element is in an operative position, the groove is sized larger than the combined size of the flanges received in the groove so as to provide adjacent ends of the connected conduit elements with a predetermined degree of freedom of longitudinal movement,
the coupling means including
sealing means disposed between the peripheral ring members and the base members,
the clamp elements being connected together about the flanges in an operative position such that
the sealing means is sandwiched between said peripheral ring members and said base members for fluid tight sealing of said coupling means, and adjacent ends of the conduit elements have a predetermined degree of longitudinal freedom of movement,
the opposed side wall members of each said groove having flat wall surfaces, said wall surfaces sloping away from each other, the second side member of each flange having a flat surface of complimentary slope to that of a respective side wall member and being configured to permit sliding abutting engagement therewith for urging the ends of the conduit elements towards each other when a clamp element passes from a non-operative position to an operative position.

2. A system as defined in claim 1 wherein said conduit elements have an inner diameter of less than 90 cm.

3. A system as defined in claim 1 wherein said conduit elements have an inner diameter selected from the range of 0.5 cm to 89 cm.

4. A system as defined in claim 1 wherein said clamp elements are connected together by releasable connection means.

5. A system as defined in claim 4 wherein said releasable connection means comprises nuts and bolts.

6. A system as defined in claim 1 wherein each flange of said coupling means is disposed such that the first member of the flange is adjacent to the end of a respective conduit element.

7. A system as defined in claim 1 wherein said coupling means includes adjustment means for adjusting the predetermined degree of movement.

8. A system as defined in claim 7 wherein said adjustment means comprises an adjustment screw having an abutment end extending through a side wall member of said groove for abutting contact with a respective side member of said flange.

9. A system as defined in claim 1 wherein the opposed side wall members of said clamp elements are sized such that, when the clamp elements are in an operative position, the opposed side wall members are spaced apart from respective conduit elements a predetermined distance.

10. A system as defined in claim 3 wherein said clamp elements are connected together by releasable connection means.

11. A system as defined in claim 10 wherein said releasable connection means comprises nuts and bolts.

12. A system as defined in claim 3 wherein each flange of said coupling means is disposed such that the first member of the flange is adjacent to the end of a respective conduit element.

13. A system as defined in claim 3 wherein said coupling means includes adjustment means for adjusting the predetermined degree of movement.

14. A system as defined in claim 13 wherein said adjustment means comprises an adjustment screw having an abutment end extending through a side wall member of said groove for abutting contact with a respective side member of said flange.

15. A system as defined in claim 3 wherein the opposed side wall members of said clamp elements are sized such that, when the clamp elements are in an operative position, the opposed side wall members are spaced apart from respective conduit elements a predetermined distance.

16. A system as defined in claim 1 wherein said conduit elements have an inner diameter of 90 cm or more.

17. A coupling means for connecting together adjacent conduit elements,
characterized in that
said coupling means comprises
    two peripheral flanges, each peripheral flange being fixed to a respective conduit element and extending radially therefrom, and
    ring clamp means,
each flange having a first side member, a second side member axially remote from the end of the conduit section relative to the first side member and a peripheral ring member disposed between the first and second side members, the ring clamp means comprising
    a plurality of clamp elements which together are configured for surrounding the said flanges, and
    each said clamp element having a groove configured for receiving said flanges, said groove being defined by a base member disposed between opposed side wall members, said groove and said flanges being configured to co-operate such that when the clamp element is in an operative position, the groove is sized larger than the combined size of the flanges received in the groove so as to provide adjacent ends of the connected conduit elements with a
    predetermined degree of freedom of longitudinal movement, and
wherein the coupling means includes
    sealing means for disposition between the peripheral ring members and the base members, and
    means for connecting the clamp elements together about the flanges in an operative position such that
        the sealing means is sandwiched between said peripheral ring members and said base members for fluid tight sealing of said coupling means and
        adjacent ends of the conduit elements have a predetermined degree of longitudinal freedom of movement,
the opposed side wall members of said groove each having flat wall surfaces, said wall surfaces sloping away from each other, the second side member of each flange having a flat surface of complimentary slope to that of a respective side wall member and being configured for permitting sliding abutting engagement therewith for urging the ends of the conduit elements towards each other when a clamp element passes from a non-operative position to an operative position.

18. A coupling means as defined in claim 17 wherein said conduit elements have an inner diameter of less than 90 cm.

19. A coupling means as defined in claim 17 wherein said conduit elements have an inner diameter selected from the range of 0.5 cm to 89 cm.

20. A coupling means as defined in claim 17 wherein said clamp elements are connectable together by releasable connection means.

21. A coupling means as defined in claim 20 wherein said releasable connection means comprises nuts and bolts.

22. A coupling means as defined in claim 17 wherein each flange of said coupling means is disposed such that the first member of the flange is adjacent to the end of a respective conduit element.

23. A coupling means as defined in claim 17 wherein said coupling means includes adjustment means for adjusting the predetermined degree of movement.

24. A coupling means as defined in claim 23 wherein said adjustment means comprises an adjustment screw having an abutment end extending through a side wall member of said groove for abutting contact with a respective side member of said flange.

25. A coupling means as defined in claim 17 wherein the opposed side wall members of said clamp elements are sized such that, when the clamp elements are in an operative position, the opposed side wall members are spaced apart from respective conduit elements a predetermined distance.

26. A coupling means as defined in claim 19 wherein said clamp elements are connectable together by releasable connection means.

27. A coupling means as defined in claim 26 wherein said releasable connection means comprises nuts and bolts.

28. A coupling means as defined in claim 19 wherein each flange of said coupling means is disposed such that the first member of the flange is adjacent to the end of a respective conduit element.

29. A coupling means as defined in claim 19 wherein said coupling means includes adjustment means for adjusting the predetermined degree of movement.

30. A coupling means as defined in claim 29 wherein said adjustment means comprises an adjustment screw having an abutment end extending through a side wall member of said groove for abutting contact with a respective side member of said flange.

31. A coupling means as defined in claim 19 wherein the opposed side wall members of said clamp elements are sized such that, when the clamp elements are in an operative position, the opposed side wall members are spaced apart from respective conduit elements a predetermined distance.

32. A coupling means as defined in claim 17 wherein said conduit elements have an inner diameter of 90 cm or more.

33. A hydroelectic generating plant water conduit system, comprising a plurality of large diameter conduit elements wherein adjacent conduit elements are connected together by a coupling means,
characterized in that
said coupling means comprises
    two peripheral flanges, each peripheral flange being fixed to a respective conduit
    element and extending radially therefrom, and
    ring clamp means, each flange having a first side member, a second side member axially remote from the end of the conduit section relative to the first side member and a peripheral ring member disposed between the first and second side members, the ring clamp means comprising
    a plurality of clamp elements which together surround the said flanges, each said clamp element having a groove configured to receive said flanges, said groove being defined by a base member disposed between opposed side wall members, said groove and said flanges being configured to co-operate such that when the clamp element is in an operative position, the groove is sized larger than the combined size of the flanges received in the groove so as to provide adjacent ends of the connected conduit elements with a predetermined degree of freedom of longitudinal movement,
the coupling means including
    sealing means disposed between the peripheral ring members and the base members,
the clamp elements being connected together about the flanges in an operative position such that
    the sealing means is sandwiched between said peripheral ring members and said base members for fluid tight sealing of said coupling means, and adjacent ends of the conduit elements have a predetermined degree of longitudinal freedom of movement, the opposed side wall members of each said groove having flat wall surfaces, said wall surfaces sloping away from each other, the second side member of each flange having a flat surface of complimentary slope to that of a respective side wall member and being configured to permit sliding abutting engagement therewith for urging the ends of the conduit elements towards each other when a clamp element passes from a non-operative position to an operative position.

34. A system as defined in claim 33 wherein said clamp elements are connected together by releasable connection means.

35. A system as defined in claim 34 wherein said releasable connection means comprises nuts and bolts.

36. A system as defined in claim 33 wherein each flange of said coupling means is disposed such that the first member of the flange is adjacent to the end of a respective conduit element.

37. A system as defined in claim 33 wherein said conduit elements have an inner diameter of 90 cm or more.

38. A system as defined in claim 33 wherein said coupling means includes adjustment means for adjusting the predetermined degree of movement.

39. A system as defined in claim 38 wherein said adjustment means comprises an adjustment screw having an abutment end extending through a side wall member of said groove for abutting contact with a respective side member of said flange.

40. A system as defined in claim 33 wherein the opposed side wall members of said clamp elements are sized such that, when the clamp elements are in an operative position, the opposed side wall members are spaced apart from respective conduit elements a predetermined distance.

41. A coupling means for connecting together adjacent large diameter conduit elements,
characterized in that
said coupling means comprises
  two peripheral flanges, each peripheral flange being fixed to a respective conduit element and extending radially therefrom, and
  ring clamp means,
each flange having a first side member, a second side member axially remote from the end of the conduit section relative to the first side member and a peripheral ring member disposed between the first and second side members, the ring clamp means comprising
  a plurality of clamp elements which together are configured for surrounding the said flanges, and
  each said clamp element having a groove configured for receiving said flanges, said groove being defined by a base member disposed between opposed side wall members, said groove and said flanges being configured to co-operate such that when the clamp element is in an operative position, the groove is sized larger than the combined size of the flanges received in the groove so as to provide adjacent ends of the connected conduit elements with a predetermined degree of freedom of longitudinal movement,
and
wherein the coupling means includes
  sealing means for disposition between the peripheral ring members and the base members, and
  means for connecting the clamp elements together about the flanges in an operative position such that
    the sealing means is sandwiched between said peripheral ring members and said base members for fluid tight sealing of said coupling means and
    adjacent ends of the conduit elements have a predetermined degree of longitudinal freedom of movement,
the opposed side wall members of said groove each having flat wall surfaces, said wall surfaces sloping away from each other, the second side member of each flange having a flat surface of complimentary slope to that of a respective side wall member and being configured for permitting sliding abutting engagement therewith for urging the ends of the conduit elements towards each other when a clamp element passes from a non-operative position to an operative position.

42. A coupling means as defined in claim 41 wherein said clamp elements are connectable together by releasable connection means.

43. A coupling means as defined in claim 42 wherein said releasable connection means comprises nuts and bolts.

44. A coupling means as defined in claim 41 wherein each flange of said coupling means is disposed such that the first member of the flange is adjacent to the end of a respective conduit element.

45. A coupling means as defined in claim 41 wherein said conduit elements have an inner diameter of 90 cm or more.

46. A coupling means as defined in claim 41 wherein said coupling means includes adjustment means for adjusting the predetermined degree of movement.

47. A coupling means as defined in claim 46 wherein said adjustment means comprises an adjustment screw having an abutment end extending through a side wall member of said groove for abutting contact with a respective side member of said flange.

48. A coupling means as defined in claim 41 wherein the opposed side wall members of said clamp elements are sized such that, when the clamp elements are in an operative position, the opposed side wall members are spaced apart from respective conduit elements a predetermined distance.

* * * * *